Feb. 9, 1965    M. OSTERMANN    3,168,995
SPOOL SUPPORT FOR TEXTILE MACHINES
Filed Sept. 9, 1963
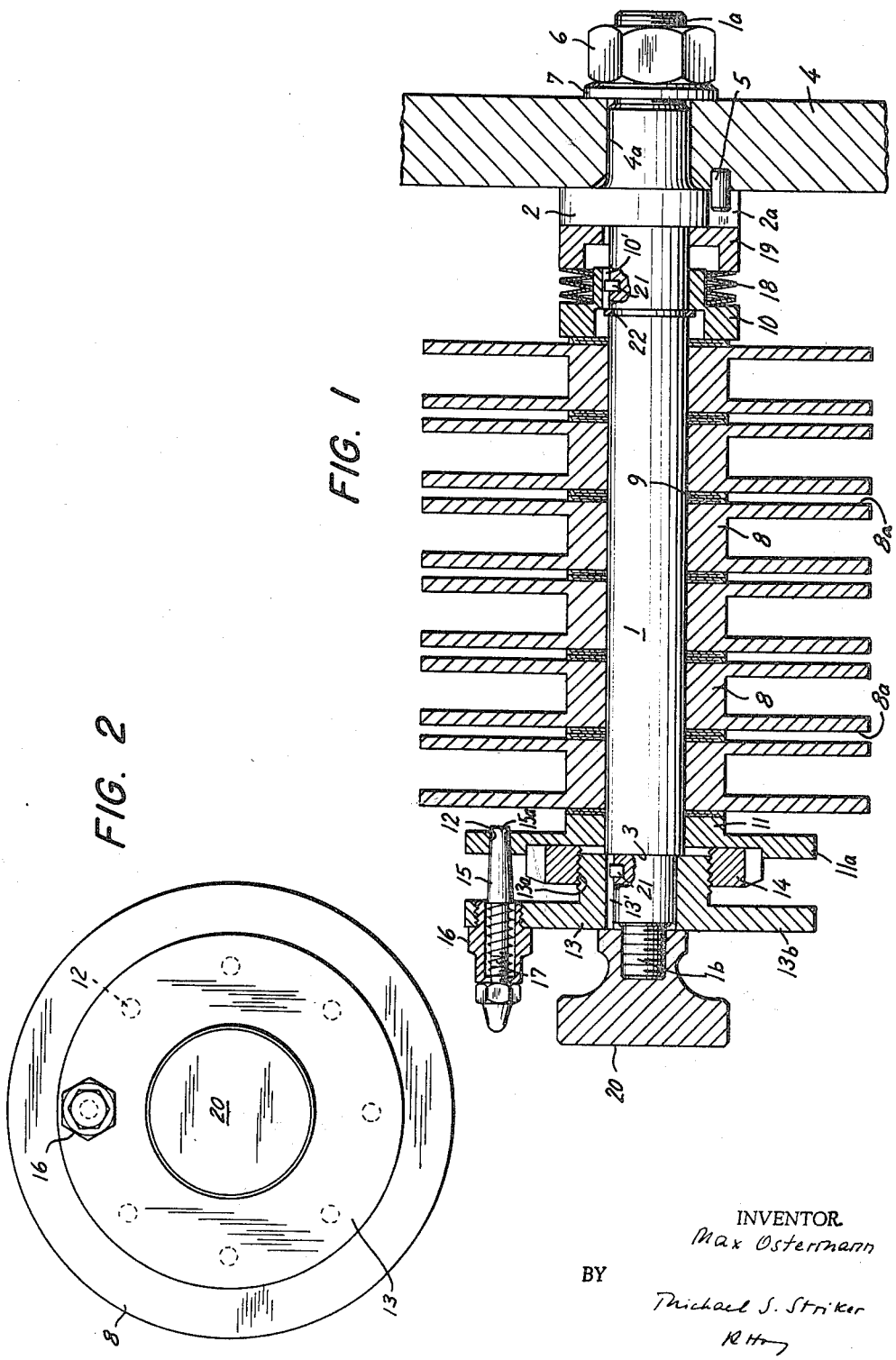
INVENTOR.
Max Ostermann
BY
Michael S. Striker United States Patent Office 3,168,995
Patented Feb. 9, 1965

3,168,995
SPOOL SUPPORT FOR TEXTILE MACHINES
Max Ostermann, Hohenzollernstrasse 7,
Wuppertal-Barmen, Germany
Filed Sept. 9, 1963, Ser. No. 307,544
10 Claims. (Cl. 242—129.8)

The present invention relates to a spool support for textile machines such as stranding, braiding machines or the like, having several spools rotatably mounted upon a common axis, and an adjustable braking mechanism regulating the run off speed of the spools. Spools supports of this type known in the art have the disadvantage that the threads running off from the spools have varying tension, as the supply of thread cannot be sufficiently accurately spooled up onto the individual spools so as to assure uniform tension of all the threads when the supply of threads is drawn off.

It is an object of the present invention to avoid the disadvantages of spool supports of the mentioned type known in the art.

It is an additional object of the present invention to provide a spool support in which all threads running off from the spools will be under substantially uniform tension.

It is a further object of the present invention to provide a spool support in which the pull off tension of the threads can be easily and accurately adjusted.

Finally, it is also an object of the present invention to provide for a spool support in which the plurality of spools and other elements mounted on the support can be easily assembled with or removed from the support for replacement or repair purpose.

With these objects in view, the spool support of the present invention includes a shaft fixed at one end thereof to a support and having a free end opposite said one end, a plurality of rotatable spools mounted on said shaft adjacent each other, a friction coupling means between any two adjacent spools and frictionally engaging the same so as to transmit a moment imparted to one spool to the spools adjacent thereto, whereby when filaments wound on adjacent spools in opposite directions are pulled off, said spools will be respectively rotated in opposite directions and a braking moment will be imparted to one spool by the spools adjacent thereto.

The spool support includes further a pair of braking disk means on the shaft and respectively engaging the outermost of the plurality of spools on the side thereof facing away from the spools adjacent thereto. These braking disk means are arranged coaxially on the shaft movably in longitudinal direction thereof, and preferably prevented from turning about the shaft axis. Resilient means engage one of the braking disk means and these resilient means are biased to press the braking disk means against the spool adjacent thereto. The spool support includes further adjusting means connected to the other of the braking means for adjusting the position thereof along the shaft, whereby the degree of stressing of said resilient means and therewith the braking moment imparted to each spool may be adjusted.

Preferably, the friction coupling means are in form of friction disks respectively sandwiched between adjacent end faces of any two adjacent spools and frictionally engaging the end faces thereof.

The adjusting means are preferably mounted in the region of the free end of the shaft and they may include an annular member non-rotatably mounted on the shaft and formed with an outer screw thread, and a nut member fixed to one side of the braking disk means mounted in the region of the free end of the shaft and threadingly engaging the outer screw thread formed on the aforementioned annular member. By turning the screw member on the outer thread of the annular member, the position of the screw member and therewith the position of the braking disk means connected thereto can be adjusted in longitudinal direction of the shaft so as to adjust the stress imparted to the resilient means and thereby the force with which the end faces of the spools are pressed against the friction disks sandwiched therebetween. To facilitate turning of the nut member and to make a very accurate positioning of the braking disk means connected thereto possible, this braking disk means is preferably formed with a radially extending flange which may be knurled at the outer surface thereof.

The arrangement may also include releasable locking means including a spring pressed pin mounted on the annular member shiftable in axial direction and the radial flange may be formed with a plurality of bores therethrough equally distributed along a circle concentric with the shaft axis, whereby the pin may be selectively engaged with one end thereof into one of the bores in the flange portions so as to lock the braking disk means formed with the radially extending flange portion in an adjusted position.

The spools and all other elements mounted on the shaft are arranged in such a manner that they can be longitudinally withdrawn therefrom over the free end of the shaft without removing the shaft from its support. A nut screwed on the threaded free end of the shaft may serve to hold all elements on the shaft in position.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a longitudinal section through the spool support according to the present invention; and FIG. 2 is an end view thereof.

Referring now to the drawing, and more specifically to FIG. 1 of the same, it will be seen that the spool support according to the present invention includes a shaft 1 having opposite threaded ends 1a and 1b and being formed adjacent to but spaced from the end 1a with an integral collar 2 and adjacent to but spaced from the opposite threaded end 1b with a shoulder 3. The portion of the shaft 1 between the collar 2 and the threaded end 1a extends through a bore 4a formed in a support plate 4 which may be part of a frame of the machine on which the spool support is mounted. A nut 6 is threaded onto the threaded end 1a of the shaft projecting beyond the support plate 4 and a washer 7 is preferably sandwiched between the nut and the face of the support plate 4 facing away from the shoulder 2. By tightening the nut 6 on the threaded shaft end 1a, the collar will be tightly pressed against the support plate 4 and thereby the shaft 1 will be fixed to the support plate with the portion of the shaft extending to the left side of the collar 2, as viewed in FIG. 1, freely projecting from the support plate 4. Collar 2 may be formed with a notch 2a in which a pin 5 fixed to and laterally projecting from plate 4 engages to positively prevent rotation of shaft 1 about its axis. A plurality of spools 8 are mounted on the shaft 1 freely rotatable thereon, between the collar 2 and the shoulder 3 thereof, and a plurality of friction coupling means in the form of friction disks 9 are respectively sandwiched between the end faces 8a of adjacent spools.

A pair of braking disc means 10 and 11 are mounted on the shaft respectively engaging the outer end faces 8a of the outermost spools 8. The braking disc means 10 is formed in a hub portion thereof with a key slot 10′ in which a pin 21 fixed in a bore of the shaft extends so that the braking disc means 10 may move longitudinally with respect to the shaft, but is prevented from turning relative thereto. A snap ring 22 fixed in a groove formed in the shaft 1 limits the movement of the braking disc 10 toward the left, as viewed in FIG. 1. Resilient means or compression spring means shown in the drawing as a plurality of dished spring washers 18 are arranged about the hub portion of the braking disc means 10 and engage with one end thereof a shoulder of the braking disc means 10 facing the collar 2, whereas the other end of the compression spring means 18 abuts against a member 19 located between the compression spring means 18 and the collar 2 on the shaft. The compression spring means 18 are biased to press the braking disc means 10 against the spool 8 adjacent thereto.

Adjusting means are mounted in the region of the free end 1b of the shaft and connected to the braking disc means 11 for adjusting the position thereof along the shaft. The adjusting means include, as shown in FIG. 1, an annular member 13 mounted on the shaft 1 between the threaded free end 1b thereof and the shoulder 3. The annular member 13 is formed with a key slot 13′ in which a pin 21 fixed in a bore of the shaft extends so that the annular member 13 may move in longitudinal direction of the shaft while being prevented from rotation relative thereto. The annular member 13 is formed in a hub portion thereof with an outer screw thread 13a which is threadingly engaged by a corresponding inner screw thread formed in a nut member 14 which is fixed to the side of the braking disc means 11 which faces away from the spool 8 adjacent thereto. The braking disc means 11 is formed on the side thereof to which the nut member 14 is connected with a radially extending flange portion 11a which is formed with a plurality of bores 12 therethrough which are uniformly distributed along a circle concentric with the shaft axis. The outer peripheral surface of the flange portion 11a may be knurled or serrated to facilitate turning of the braking disc means 11 and the nut 14 connected thereto, and it is obvious that by thus turning the braking disc means 11 the position relative to annular member 13 will be adjusted. The annular member 13 is fixed on the shaft 1 by an additional nut member 20 screwed onto the threaded free end portion 1b of the shaft, whereby by tightening the additional nut member 20 the annular member will be pressed with its right face thereof, as viewed in FIG. 1, against the shoulder 3 of the shaft. The arrangement includes further releasable locking means which may include a pin member 15 mounted in a bushing 16 so that the tapered end 15a of the pin may be selectively engaged in one of the bores 12 formed in the radially extending flange portion 11a of the braking disc means 11. The pin 15, when engaged in one of the bores 12 will hold the braking disc means 7a in an adjusted position. The bushing 16 guiding the pin 15 is mounted in a bore formed in a radially extending flange portion 13b formed on the annular member 13. Preferably, resilient means in form of a compression spring 17 engaging with opposite ends thereof a shoulder formed on the bushing 16 and a shoulder formed on the pin 15 are provided for holding the end 15a of the pin in the respective bore 12.

The spool support according to the present invention will operate as follows:

When filaments, not shown in the drawing, wound on adjacent spools in opposite directions, are pulled off to one side of the support shaft 1, adjacent spools 8 will be respectively rotated in opposite directions and thereby a braking moment will be imparted to each spool by the spools adjacent thereto, due to the friction disc 9 which are sandwiched between adjacent spools, whereby the tension in all threads pulled off from the spools will be substantially uniform. The force by means of which the various friction discs are pressed against the end faces of the spools may be adjusted by adjusting the position of the braking disc means 11 by screwing the nut 14 connected thereto in one or the other direction on the outer screw thread 13 of the annular member 13 fixed to the free end of the shaft 1. By adjusting the position of the braking disc means 11 towards the right, as viewed in FIG. 1, the compression spring means 18 will be compressed to a greater degree, whereby the force by means of which the opposite faces of the spools 8 will be pressed against the friction discs 9 will be increased, whereas adjusting the position of the braking disc means 11 in the opposite direction will obviously lead to a decrease of the braking force. The releasable locking means including the pin 15 serve to lock the arrangement in the above described manner in one of a plurality of adjusted positions corresponding to the number of bores 12 formed in the flange portion 11a of the braking disc means 11. These bores may be consecutively numbered to facilitate adjusting of the arrangement to a desired braking force.

By removing the additional nut member 20 from the threaded free end 1b of the shaft all elements mounted on the shaft may be removed in longitudinal direction thereof over the free end without removing the shaft 1 from the support plate 4. This will greatly facilitate removing of the spools 8 from the shaft 1 when the threads wound thereon are completely unwound therefrom and replacing these spools with new ones, as well as replacing any of the other members mounted on the shaft when such replacement becomes necessary for repair purpose.

It will be understood that each of the elements described above or two or more together, may also find a useful application in other types of spool supports differing from the types described above.

While the invention has been illustrated and described as embodied in a spool support for a braiding machine or the like, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Spool support for a braiding machine or the like comprising, in combination, a shaft fixed at one end thereof to a support and having a free and opposite said one end; a plurality of spools rotatably mounted on said shaft adjacent each other; a friction coupling means arranged freely rotatable with respect to said fixed shaft between any two adjacent spools and frictionally engaging the same so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal directoin thereof while being prevented from turning about said shaft axis; resilient means engaging one of said braking disc means and biased to press said braking disc means against the spool adjacent thereto; and adjusting means connected to the other of said braking disc means for adjusting the position thereof along said shaft, whereby the degree of stressing of said resilient means and therewith the braking moment imparted to each spool may be adjusted.

2. Spool support for a braiding machine or the like comprising, in combination, a shaft fixed at one end thereof to a support and having a free and opposite said one end; a plurality of spools rotatably mounted on said shaft adjacent each other; a friction coupling means arranged freely rotatable with respect to said fixed shaft between any two adjacent spools and frictionally engaging the same so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof; resilient means engaging said one of said braking disc means and biased to press said braking disc means against the spool adjacent thereto; and adjusting means on said free end of said shaft and connected to the other of said braking disc means for adjusting the position thereof along said shaft, whereby the degree of stressing of said resilient means and therewith the braking moment imparted to each spool may be adjusted.

3. Spool support for a braiding machine or the like comprising, in combination, a shaft fixed at one end thereof to a support and having a free end opposite said one end; a plurality of spools rotatably mounted on said shaft adjacent each other; a friction coupling means arranged freely rotatable with respect to said fixed shaft between any two adjacent spools and frictionally engaging the same so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof; compression spring means engaging said one of said braking disc means and biased to press said braking disc means against the spool adjacent thereto; and adjusting means on said free end of said shaft and connected to the other of said braking disc means for adjusting the position thereof along said shaft, whereby the degree of compression of said compression spring means and therewith the braking moment imparted to each spool may be adjusted.

4. Spool support for a braiding machine or the like comprising, in combination, a shaft fixed at one end thereof to a support and having a free end opposite said one end; a plurality of spools rotatably mounted on said shaft adjacent each other, each of said spools having a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof; compression spring means engaging said one of said braking disc means and biased to press said braking disc means against the spool adjacent thereto; and adjusting means on said free end of said shaft and connected to the other of said braking disc means for adjusting the position thereof along said shaft, whereby the degree of compression of said compression spring means and therewith the braking moment imparted to each spool may be adjusted.

5. Spool support for a braiding machine or the like comprising, in combination, a support plate formed with a bore therethrough; a shaft extending with one end thereof through said wall and being fixed at said one end thereof to said support plate and having a free end opposite said one end; a plurality of spools rotatably mounted on said shaft adjacent each other, each of said spools having a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof; compression spring means engaging said one of said braking disc means and biased to press said braking disc means against the spool adjacent thereto; and adjusting means on said free end of said shaft and connected to the other of said braking disc means for adjusting the position thereof along said shaft, whereby the degree of compression of said compression spring means and therewith the braking moment imparted to each spool may be adjusted.

6. Spool support for a braiding machine or the like comprising, in combination, a shaft fixed at one end thereof to a support and having a free end opposite said one end; a plurality of spools rotatably mounted on said shaft adjacent each other, each of said spools having a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof; compression spring means engaging said one of said braking disc means and biased to press said braking disc means against the spool adjacent thereto; and adjusting means on said free end of the shaft and including an annular member fixed to said free end of said shaft and being formed with an outer screw thread, and a nut member screwed on said outer screw thread and engaging the other of said braking disc means for adjusting the position thereof along said shaft, whereby the degree of compression of said compression spring means and therewith the braking moment imparted to each spool may be adjusted.

7. Spool support for a braiding machine or the like comprising, in combination, a shaft fixed at one end thereof to a support and having a free end opposite said one end; a plurality of spools rotatably mounted on said shaft adjacent each other, each of said spools having a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof, said other braking disc means having at one side thereof facing away from the spool adjacent thereto a radially extending flange portion; compression spring means engaging said one of said braking disc means and biased to press said braking disc means against the spool adjacent thereto; adjusting means on said free end of the shaft and including an annular member fixed to said free end of said shaft and being formed with an outer screw thread, and a nut member fixed to said one side of said other braking disc means and threadingly engaging said outer screw thread for adjusting the position of said other braking disc means along said shaft, whereby the degree of compression of said compression spring means and therewith the braking moment imparted to each spool may be adjusted; and releasable locking means mounted on said annular member and engaging said radially extending flange portion for fixing the position of said other braking disc means relative to said annular member.

8. Spool support for a braiding machine or the like comprising, in combination, a shaft fixed at one end thereof to a support and having a free end opposite said one end; a plurality of spools rotatably mounted on said shaft adjacent each other, each of said spools having a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof, said other braking disc means having at one side thereof facing away from the spool adjacent thereto a radially extending flange portion formed with a plurality of bores therethrough evenly distributed along a circle concentric with the shaft axis; compression spring means engaging said one of said braking disc means and biased to press said braking disc means against the spool adjacent thereto; adjusting means on said free end of the shaft and including an annular member fixed to said free end of said shaft and being formed with an outer screw thread, and a nut member fixed to said one side of said other braking disc means and threadingly engaging said outer screw thread for adjusting the position of said other braking disc means along said shaft, whereby the degree of compression of said compression spring means and therewith the braking moment imparted to each spool may be adjusted; and releasable locking means including a pin mounted on said annular member shiftable in axial direction and adapted to selectively engage with one end thereof into one of said bores on said flange portion for fixing the position of said other braking disc means relative to said annular member.

9. Spool support for a braiding machine or the like comprising, in combination, a shaft fixed at one end thereof to a support and having a free end opposite said one end; a plurality of spools rotatably mounted on said shaft adjacent each other, each of said spools having a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments wound on adjacent spools in opposite directions are pulled off, said spools will be respectively rotated in opposite directions and a braking moment will be imparted to each spool by the spools adjacent thereto; a pair of braking disc means on said shaft and respectively engaging the outermost of said plurality of spools on the sides thereof facing away from the spools adjacent thereto, said braking disc means being arranged coaxially on said shaft movably in longitudinal direction thereof while being prevented from turning about said shaft axis, one of said braking disc means being arranged adjacent said one end of said shaft and the other adjacent said free end thereof, said other braking disc means having at one side thereof facing away from the spool adjacent thereto a radially extending flange portion formed with a plurality of bores therethrough evenly distributed along a circle concentric with the shaft axis; compression spring spring means engaging said one of said braking disc means and biased to press said braking disc means against the spool adjacent thereto; adjusting means on said free end of the shaft and including an annular member fixed to said free end of said shaft and being formed with an outer screw thread, and a nut member fixed to said one side of said other braking disc means and threadingly engaging said outer screw thread for adjusting the position of said other braking disc means along said shaft, whereby the degree of compression of said compression spring means and therewith the braking moment imparted to each spool may be adjusted; and releasable locking means including a pin mounted on said annular member shiftable in axial direction and adapted to selectively engage with one end thereof into one of said bores on said flange portion and resilient means engaging said pin and tending to maintain the same engaged in the respective bore for fixing the position of said other braking disc means relative to said annular member.

10. Spool support for a braiding machine or the like comprising, in combination, a support plate formed with a bore therethrough; a shaft having opposite threaded ends and being formed adjacent one end with an integral collar and adjacent the other end with a shoulder, said one end extending through said bore of said support plate; a nut screwed on said one threaded end to press thereby said collar against said support plate so that said shaft is fixed to the latter freely projecting therefrom; a plurality of spools rotatably mounted on said shaft between said collar and said shoulder and having each a pair of end faces substantially normal to the shaft axis; a friction disc arranged freely rotatable with respect to said fixed shaft sandwiched between adjacent end faces of any two adjacent spools and frictionally engaging said end faces so as to transmit a moment imparted to one spool to the spools adjacent thereto, whereby when filaments would on adjacent spools in opposite directions are pulled off, said spools will be respectively rotated in opposite directions and a braking moment will be imparted to each spool by the spools adjacent thereto; a pair of braking disc means on said shaft and respectively engaging the outermost end faces of the outermost of said plurality of spools, said braking disc means being arranged coaxially on said shaft movably in longitudinal direction thereof while being prevented from turning about the shaft axis, one of said braking disc means being arranged adjacent said one end of said shaft and the other adjacent the free end thereof, said other braking disc means having at one side thereof facing away from the spool adjacent thereto a radially extending flange portion formed with a plurality of bores therethrough evenly distributed along a circle concentric with the shaft axis; compression spring means in form of a plurality of dished spring washers located between said one friction disc means and said collar and biased to press said one braking disc means against the spool adjacent thereto; adjusting means mounted on said shaft adjacent said shoulder and including an annular member non-rotatably mounted on said shaft and formed with an outer screw thread and a nut member fixed to said one side of said other braking disc means and threadingly engaging said outer screw thread; releasable locking means including a pin mounted on said annular member shiftable in axial direction and adapted to selectively engage with one tapered end thereof into one of said bores in said flange portion, and resilient means engaging said pin and tending to maintain the end thereof in the respective bore; and an additional nut member screwed on the other threaded end of said shaft and engaging said annular member to press the same against said shoulder of said shaft, whereby by unscrewing said additional nut member all elements mounted on said shaft may be removed therefrom without removing said shaft from said support plate.

References Cited by the Examiner

UNITED STATES PATENTS

| | | | |
|---|---|---|---|
| 778,494 | 12/04 | Kreeger | 242—156 X |
| 958,062 | 5/10 | Adkins | 242—55.3 |
| 2,911,875 | 11/59 | Ostermann et al. | |
| 3,109,605 | 11/63 | Ostermann | 242—129.8 |

MERVIN STEIN, *Primary Examiner.*